(12) United States Patent
Kuehler et al.

(10) Patent No.: US 7,576,025 B2
(45) Date of Patent: Aug. 18, 2009

(54) COMPOSITION FOR REDUCING $O_x$ EMISSIONS IN FCC REGENERATION PROCESS

(75) Inventors: Christopher W. Kuehler, Larkspur, CA (US); Paul O'Connor, Hoevelaken (NL); Dennis Stamires, Dana Point, CA (US)

(73) Assignee: Albemarle Netherlands B.V., Amsterdam (NL)

( * ) Notice: Subject to any disclaimer, the term of this patent is extended or adjusted under 35 U.S.C. 154(b) by 0 days.

(21) Appl. No.: 10/588,081

(22) PCT Filed: Oct. 12, 2004

(86) PCT No.: PCT/EP2004/011457

§ 371 (c)(1), (2), (4) Date: Jul. 19, 2007

(87) PCT Pub. No.: WO2005/040311

PCT Pub. Date: May 6, 2005

(65) Prior Publication Data

US 2007/0275847 A1    Nov. 29, 2007

(30) Foreign Application Priority Data

Oct. 21, 2003   (EP) .................................. 03078313

(51) Int. Cl.
*B01J 29/06*   (2006.01)
*C10G 11/05*   (2006.01)
*C10G 11/18*   (2006.01)

(52) U.S. Cl. ............................. 502/68; 502/60; 502/64; 502/65; 502/79; 208/113; 208/118; 208/119; 208/120.01; 208/120.25; 208/121; 208/122

(58) Field of Classification Search ................... 502/60, 502/64, 65, 68, 79; 208/113, 118, 119, 120.01, 208/120.25, 121, 122
See application file for complete search history.

(56) References Cited

U.S. PATENT DOCUMENTS

| | | | |
|---|---|---|---|
| 4,946,581 A | * | 8/1990 | van Broekhoven ..... 208/120.25 |
| 6,281,164 B1 | * | 8/2001 | Demmel et al. ............. 502/439 |
| 6,930,067 B2 | * | 8/2005 | O'Connor et al. ............. 502/64 |

FOREIGN PATENT DOCUMENTS

| | | |
|---|---|---|
| EP | 0 278 535 B1 | 2/1991 |
| WO | WO 87/06156 A1 | 10/1987 |
| WO | WO 01/12570 A1 | 2/2001 |

OTHER PUBLICATIONS

A. Corma, et al; "Optimization of SOx Additives of FCC Catalysts Based on MgO-Al2O3 Mixed Oxides Produced From Hydrotalcites"; Applied Catalysis B: Environmental; 1994; p. 29-43; vol. 4; Elsevier Science B.V.; Amsterdam, Netherlands.

* cited by examiner

*Primary Examiner*—Elizabeth D Wood
(74) *Attorney, Agent, or Firm*—Jeremy J. Kliebert

(57) ABSTRACT

A composition comprising FCC catalyst particles and additive particles suitable for the reduction of $NO_x$ emissions from a FCC regenerator, said additive particles comprising a Mg and Al-containing anionic clay or solid solution, a rare earth metal oxide, alumina and/or silica-alumina, and Y-type zeolite. The invention further relates to a process for preparing such a composition and its use for reducing $NO_x$ emissions.

12 Claims, No Drawings

COMPOSITION FOR REDUCING $O_x$ EMISSIONS IN FCC REGENERATION PROCESS

The present invention relates to a catalyst composition comprising FCC catalyst particles and additive particles suitable for the reduction of $NO_x$ emissions from a FCC regenerator, a process for preparing said composition, and its use.

In a fluid catalytic cracking (FCC) unit, the catalyst particles circulate between a catalytic cracking zone and a regeneration zone. During regeneration, coke deposits formed on the catalyst during the cracking reaction are burnt off, resulting in environmentally undesired gases being emitted from the regeneration zone, e.g. SOx, $NO_x$, and CO. Much effort is being put into finding compositions which reduce said emissions. These compositions are added to the FCC unit either as an integral part of the FCC catalyst, or as separate particles. Compositions containing Mg—Al spinel are frequently mentioned as suitable for SOx and/or $NO_x$ reduction.

WO 01/12570 discloses particles comprising Mg—Al anionic clay and optionally an additive, e.g. cerium. This composition is prepared by first mixing gibbsite and magnesium oxide in water to form an aqueous slurry, followed by adding the additive, optionally aging the resulting mixture, thereby forming less than 75% of the final total amount of anionic clay. The product is subsequently spray-dried, calcined, and aged in order to obtain the desired anionic clay-containing composition.

This document further suggests that such compositions can be used as SOx and/or $NO_x$-reducing additives in FCC.

The performance of such additives still needs improvement. This invention relates to a catalyst composition comprising such improved additives.

The catalyst composition according to the invention comprises (i) FCC catalyst particles and (ii) additive particles suitable for the reduction of $NO_x$ emissions from an FCC regenerator, said additive particles comprising:
 a) a Mg and Al-containing anionic clay or solid solution,
 b) a rare earth metal oxide,
 c) alumina and/or silica-alumina, and
 d) Y-type zeolite.

Preferably, the catalyst composition is in the form of fluidisable particles, i.e. particles having a particle size of about 20-200 microns.

The composition according to the invention comprises FCC catalyst particles and additive particles.

Any conventional FCC catalyst particles can be used. Preferably, the FCC catalyst particles comprise (i) a zeolite, such as zeolite Y or zeolite USY, optionally exchanged with rare earth (RE) or other metals (e.g. Mg, Fe), (ii) alumina, silica, or silica-alumina, and (iii) kaolin. The preferred zeolite is a RE-exchanged zeolite USY.

The FCC catalyst particles may comprise additional ingredients, such as anionic clay, Mg—Al spinel, MgO, $SiO_2$, or $TiO_2$.

The FCC catalyst particles preferably contain 5-30 wt % of the RE-exchanged zeolite USY, 5-35 wt % of alumina, 0-20 wt % silica, and balance kaolin. More preferably, the FCC catalyst particles contain 5-20 wt % of the RE-exchanged zeolite USY, 5-30 wt % of alumina, 0-10 wt % silica, and balance kaolin.

The additive particles comprise a Mg and Al-containing anionic clay or solid solution.

Mg and Al-containing anionic clays have a crystal structure consisting of positively charged layers built up of specific combinations of magnesium and aluminium hydroxides between which there are water molecules and anions. Suitable anions are $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{6-}$ and $Mo_7O_{24}^{6-}$, monocarboxylates such as acetate, dicarboxylates such as oxalate, and alkyl sulphonates such as lauryl sulphonate.

Hydrotalcite is an example of a naturally occurring Mg and Al-containing anionic clay wherein carbonate is the predominant anion present. Meixnerite is a Mg and Al-containing anionic clay wherein hydroxyl is the predominant anion present In the prior art, anionic clays are also referred to as hydrotalcite-like materials or layered double hydroxides. In this specification we refer to these materials as anionic clays, comprising within that term hydrotalcite-like and layered double hydroxide materials.

A characteristic of Mg—Al anionic clays is that mild calcination results in the formation of a disordered MgO-like product. Said disordered MgO-like product is distinguishable from spinel (which results upon severe calcination) and from anionic clays. In this specification we refer to said disordered MgO-like material as a solid solution. Solid solutions are rehydratable, meaning that they possess a so-called memory effect whereby their exposure to water results in the reformation of the anionic clay structure.

Spinel is not rehydratable and therefore not covered by the term "solid solution" in this specification.

The Mg and Al-containing anionic clay does not necessarily consist of pure anionic clay. It may also be a component comprising the anionic clay and an aluminium or magnesium compound. This aluminium or magnesium compound can be the starting material used for the anionic clay preparation, or reacted forms thereof, as long as they are not reacted to form anionic clay. Hence, the compositions may contain some magnesium oxide, (pseudo)boehmite, brucite, aluminium trihydrate, or mixtures thereof.

Rare earth metal oxides that can suitably be used in the additive particles are $CeO_2$ and $La_2O_3$, with $CeO_2$ being preferred.

Examples of suitable aluminas to be present in the additive particles include boehmite, pseudoboehmite, flash-calcined gibbsite (CP aluminas), gamma alumina, and heat-treated forms thereof. A preferred alumina source is peptised pseudoboehmite.

Examples of suitable silica-aluminas that can suitably be used in the additive particles are treated clays (e.g. acid leached (metal)kaolin), precipitated silica-alumina, silica-doped alumina, alumina-doped silica, and alumina-coated silica.

A preferred Y-type zeolite is zeolite Y with a Silica-to-Alumina Ratio (SAR) of less than 6, which preferably has been exchanged with a rare earth metal (RE): REY zeolite.

Preferably, the additive particles (calculated as oxides and based on the total weight of the additive particles) comprise:
(a) Mg and Al-containing anionic clay or solid solution in an amount of about 50-65 wt. %,
(b) $CeO_2$ in an amount of about 2.5-20 wt. %,
(c) alumina in an amount of about 20-45 wt. %,
(d) a REY zeolite in an amount of about 3-8 wt. %.

More preferably, the additive particles (calculated as oxides and based on the total weight of the additive particles) comprise:
(a) Mg and Al-containing anionic clay or solid solution in an amount of about 50-65 wt. %,
(b) $CeO_2$ in an amount of about 6-12 wt. %,
(c) alumina in an amount of about 25-35 wt. %,
(d) a REY zeolite in an amount of about 3-8 wt. %.

In some embodiments, the amount of REY zeolite is an amount of about 2-10 wt. %.

The amount of CeO$_2$ does not include the amount of cerium that may be present in the REY zeolite.

Even more preferably, silica is present in the additive particles in an amount of 2-8 wt %.

The additive particles are preferably prepared by a process comprising the following steps:

(1) combining an aluminium source and a magnesium source in water to form an aqueous slurry;
(2) optionally milling the slurry,
(3) aging the slurry,
(4) combining a rare earth metal oxide or a precursor thereof with the product of step (3),
(5) spray-drying the product of step (4),
(6) calcining the spray-dried material,
(7) optionally slurrying the product of step (6) in water,
(8) milling the product of step (6) or (7),
(9) combining the product of step (6), (7), or (8) with the alumina and/or silica-alumina and the Y-type zeolite, and
(10) shaping the product of step (9) to form additive particles.

These additive particles are then physically mixed with the FCC particles to form the composition according to the present invention. The mixing can be performed before the composition enters the FCC unit. Alternatively, the FCC catalyst particles and the additive particles are added separately to the FCC unit, in which they are then mixed in situ.

Alternatively, the rare earth metal oxide or a precursor thereof is not added to the slurry in step (4), but already in step (1), step (2), or step (3).

Suitable aluminium sources for use in step (1) of the above process include aluminium oxides and hydroxides such as transition alumina, aluminium trihydrate (gibbsite, bayerite) and its thermally treated forms (including flash-calcined alumina), aluminia sols, amorphous alumina, (pseudo)boehmite, aluminium-containing clays such as kaolin, sepiolite, and bentonite, modified clays such as metakaolin, alumina salts such as aluminium nitrate, aluminium chloride, aluminium chlorohydrate, sodium aluminate.

Preferred aluminium sources are aluminium oxides and hydroxides, because they do not leave undesirable anions or cations in the final product. These aluminium oxides and hydroxides include aluminium trihydrate and its thermally treated forms (including flash-calcined alumina), aluminia sols, amorphous alumina, and (pseudo)boehmite.

Aluminium trihydrate includes crystalline aluminium trihydrate (ATH), for example gibbsites provided by Reynolds Aluminium Company RH-20® or JM Huber Micral® grades. Also BOC (Bauxite Ore Concentrate), bayerite, and nordstrandite are suitable aluminium trihydrates. BOC is the cheapest alumina source. The aluminium trihydrate is preferred to have a particle size ranging from 1 to 150 μm, more preferably from 1 to 20 μm.

Suitable magnesium sources for use in step (1) of the above process include magnesium oxides or hydroxides such as MgO, Mg(OH)$_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, saponite, and sepiolite, and mixtures of the above-mentioned magnesium sources.

MgO, Mg(OH)$_2$, hydromagnesite, magnesium carbonate, magnesium bicarbonate, and hydromagnesite are preferred, because they do not leave undesirable anions or cations in the final product.

The use of aluminium trihydrate as the aluminium source and magnesium oxide as the magnesium source is preferred.

Suitable precursors of the rare earth metal oxide include nitrates, chlorides, sulfates, hydroxides, acetates, oxalates, carbonates, or hydroxycarbonates of the desired rare earth metal (preferably La or Ce), with nitrates being preferred. Also bastnaesite can be used as rare earth metal oxide precursor.

In order to improve the accessibility of the resulting additive particles, a silica source may be added in step a). A preferred silica source is a low-sodium silica sol.

The Mg/Al ratio of the anionic clay or solid solution present in the additive particles may vary from 1 to 10, preferably from 1 to 6, most preferably from 2 to 4.

The preparation of the additive particles involves milling steps. In this specification the term "milling" is defined as any method that results in reduction of the particle size of the solids in the slurry. Such a particle size reduction can at the same time result in the formation of reactive surfaces and/or heating of the particles. Instruments that can be used for milling include ball mills, bead mills, high-shear mixers, colloid mixers, and electrical transducers that can introduce ultrasound waves into a slurry. Low-shear mixing, i.e. stirring that is performed essentially to keep the ingredients in suspension, is not regarded as "milling".

After milling step (8), the particle size of the solids in the slurry preferably is below 6 microns, more preferably below 3 microns.

During aging step (3), part of the aluminium and magnesium source may react to form an anionic clay, but it does not have to.

After this aging, the precursor of the rare earth metal oxide may be added to the slurry, after which the slurry is spray-dried to form particles.

These particles are then calcined in step (6), which calcination is preferably performed at temperatures between 2000 and 800° C. and most preferably between 400° and 600° C. Formation of spinel is generally prevented within this temperature range. The calcination is conducted for 15 minutes to 24 hours, preferably 1-12 hours and most preferably 1-4 hours.

By this treatment a Mg and Al-containing solid solution is formed. The so-formed solid solution can be hydrated to form an anionic clay in step (7). This hydration can be performed by contacting the solid solution with water for 20 minutes to 24 hours at thermal or hydrothermal conditions, preferably at temperatures ranging from 65°-85° C. Preferably, the slurry has a solids content ranging from about 10 to 50 wt %. Optionally, this hydration may be performed in the presence of metal ions, e.g. Cu, Mn, Co, Cr, or Ba.

The calcined material of step (6) or the product of step (7) must be milled (step 8), preferably after suspending the particles in water, before it is combined with the Y-type zeolite and -the alumina and/or silica-alumina in step (9).

Step (9) is preferably performed by mixing the, optionally milled, product of step (6) or (7) with the Y-type zeolite and the alumina and/or silica-alumina in an aqueous suspension. The ingredients can be added to the suspension in any sequence. Hence, the Y-type zeolite ("Y") and the alumina or silica-alumina ("A") may be added next, followed by the product ("C") of step (6) or (7). This sequence is denoted as "YAC". Other possible sequences are: AYC, ACY, CAY, CYA, and YCA.

It is further possible to add these ingredients all at the same time, or to add two ingredients at the same time, followed by the addition of the third ingredient.

After being homogenised, the suspension is spray-dried to form additive particles, which can then be physically mixed with the FCC catalyst particles.

The additive particles exhibit good $NO_x$ reducing properties in, e.g., FCC units. Therefore, the invention also relates to the use of the composition according to the invention in a FCC unit.

The temperature in the catalytic cracking zone of the FCC unit generally is in the range 375° to 650° C., more particularly 460° to 560° C. The pressure in this zone generally is between atmospheric pressure and a pressure of 7 atmospheres, more particularly between 1 and 3 atmospheres. In the regeneration zone, the catalyst is regenerated with an oxygen-containing gas at a temperature of about 540° to 825° C., more particularly 700° to 750° C., and in the pressure of steam.

EXAMPLES

Comparative Example 1

In this Example, an additive particle is prepared according to WO 01/12570.

Finely ground gibbsite and magnesium oxide powder were slurried in water in such quantities as to result in a final mixture with a molar ratio of Mg to Al of about 2.3. The mixture was milled using high-shear mixing. The slurry had a total solids content of 20 wt % and was pre-aged at ambient temperature overnight. Cerium nitrate (11 wt %, calculated on the solids content and defined as the oxide) was added. A sample was taken out, filtered, washed, and dried at 120° C. XRD analysis of this sample indicated that some anionic clay was formed and the rest of the material was unreacted gibbsite, magnesium oxide, and brucite.

Subsequently, the pre-aged material was spray-dried to form microspheres, which were then calcined at 500° C. for 2 hours. This calcined material was re-suspended in water and milled to an average particle size of 3 microns (thereby forming an anionic clay) and added to a suspension of peptised pseudo-boehmite. The resulting slurry was finally spray-dried, resulting in additive particles containing 61 wt % of anionic clay, 7 wt % of $CeC_2$, and 32 wt % of pseudoboehmite.

Example 2

An additive particle was prepared according to the process of Comparative Example 1, except that 5 kg zeolite REY (exchanged with 12 wt % rare earth metals) were added to the slurry (95 kg dry basis) just prior to spray-drying. The resulting additive particles (calculated as oxides) contained 58 wt % of Mg—Al anionic clay, 7 wt % $CeO_2$, 30 wt % of pseudo-boehmite, and 5 wt % REY.

Comparative Example 3

Example 1 was repeated, except that 8.8 g $Cu(NO_3)_2$ (expressed as CuO) were added during hydration of the calcined microspheres.

Example 4

The additive particles prepared in Comparative Example 1, Example 2, and Comparative Example 3 were mixed with a conventional spent FCC catalyst. The resulting composition comprised 1.0 wt % of additive particles and 99 wt % of FCC catalyst particles.

The catalytic reduction of $NO_x$ was measured in a fluid bed reactor heated to 700° C. and containing either 10 g of FCC catalyst only ("no additive") or 10 g of the composition comprising additive particles and FCC catalyst particles. A gas mixture was passed through the mixture. The gas leaving the reactor was analysed for $NO_x$ content.

The $NO_x$ production relative to the $NO_x$ production in the absence of additive particles (i.e. using spent FCC catalyst particles only) is indicated in Table 1.

TABLE 1

| additive | relative % $NO_x$ production |
|---|---|
| - (no additive) | 100 |
| Comparative Example 1 | 95-100 |
| Example 2 | 60-70 |
| Comparative Example 3 | 80-90 |

From this table, it is clear that the addition of a Y-type zeolite improves the $NO_x$ reducing capacity of additive particles containing Mg—Al-containing anionic clay.

The invention claimed is:

1. A composition comprising (i) FCC catalyst particles and (ii) additive particles suitable for the reduction of $NO_x$ emissions from an FCC regenerator, said additive particles comprising:
   a) a Mg and Al-containing anionic clay or solid solution,
   b) a rare earth metal oxide,
   c) alumina and/or silica-alumina, and
   d) Y-type zeolite.

2. A composition according to claim 1 wherein the additive particles, calculated as oxides and based on the total weight of the additive particles, comprise:
   a) Mg and Al-containing anionic clay in an amount of about 50-65 wt %,
   b) $CeO_2$ in an amount of about 2.5-20 wt %,
   c) alumina in an amount of about 20-45 wt %,
   d) a REY zeolite in an amount of about 2-10 wt %.

3. A composition according to claim 2 wherein the additive particles, calculated as oxides and based on the total weight of the additive particles, comprise:
   a) Mg and Al-containing anionic clay or solid solution in an amount of about 50-65 wt. %,
   b) $CeO_2$ in an amount of about 6-12 wt. %,
   c) alumina in an amount of about 25-35 wt. %,
   d) a REY zeolite in an amount of about 3-8 wt. %.

4. A composition according to any one of the preceding claims wherein the additive particles additionally contain 2-8 wt % of silica.

5. A composition according to any of claims 1-3 wherein the additive particles additionally comprise Cu.

6. A process for preparing a composition according to any of claims 1-3, comprising the steps of
   (1) combining an aluminium source and a magnesium source in water to form an aqueous slurry;
   (2) optionally milling the slurry,
   (3) aging the slurry,
   (4) combining a rare earth metal oxide or a precursor thereof with the product of step (3),
   (5) spray-drying the product of step (4),
   (6) calcining the spray-dried material,
   (7) optionally slurrying the product of step (6) in water,
   (8) milling the product of step (6) or (7),
   (9) combining the product of step (6), (7), or (8) with the alumina and/or silica-alumina and the Y-type zeolite,
   (10) shaping the product of step (9) to form additive particles, and
   (11) physically mixing said additive particles with FCC catalyst particles.

7. A process according to claim 6 wherein the aluminium source of step (1) is aluminium trihydrate and the magnesium source is magnesium oxide.

8. A process according to claim 6 wherein the alumina of step (9) is peptised pseudoboebmite.

9. An FCC process utilizing the composition according any one of claims 1-3.

10. An FCC process utilizing the composition according to claim 4.

11. An FCC process utilizing the composition according to claim 5.

12. A process according to claim 7 wherein the alumina of step (9) is peptised pseudoboebmite.

* * * * *